May 6, 1969 E. J. COOK 3,443,244

COAXIAL RESONATOR STRUCTURE FOR SOLID-STATE NEGATIVE RESISTANCE DEVICES

Filed Aug. 23, 1967

INVENTOR.
EDWARD J. COOK

BY Wm J Nolan

ATTORNEY

3,443,244
COAXIAL RESONATOR STRUCTURE FOR SOLID-STATE NEGATIVE RESISTANCE DEVICES

Edward J. Cook, South Hamilton, Mass., assignor to Varian Associates, Palo Alto, Calif., a corporation of California Filed Aug. 23, 1967, Ser. No. 662,767
Int. Cl. H03b 5/18, 7/12, 7/06
U.S. Cl. 331—96 10 Claims

ABSTRACT OF THE DISCLOSURE

A microwave oscillator utilizing a negative-resistance diode as the active element is disclosed. The diode is connected in or as the center conductor or a coaxial resonator contained within a post structure. The resonator includes a sleeve forming an outer conductor, a shorting plug or wall in the sleeve defining one end of the resonator, and a movable conductive plug closing the other end of the sleeve to define a capacitive gap circumscribing the post between the sleeve and the movable plug. The capacitance of the gap between the sleeve and the movable plug is varied, in one embodiment, to tune the resonator. In another embodiment, a tuning member is movable within the resonator for tuning the resonator. The post structure, containing the resonator, is mounted transversely to the axis of propagation in a short section of waveguide having a shorting plane closing one end. A D.C. reverse bias voltage applied to the diode produces microwave oscillation within the resonator. Electric field lines fringing out of the capacitive gap circumscribing the post couple R.F. energy into the waveguide.

*Description of the prior art*

Heretofore, negative-resistance diode oscillators have been built wherein the semiconductor device was connected in series with the center conductor of a coaxial resonator. Such a microwave device is described in an article entitled, "Electronic Tuning Effects in the Read Microwave Avalanche Diode" in the January 1966 issue of IEEE Transactions on Electron Devices, vol. ED–13, No. 1, pages 169–175. However, the device shown in FIG. 7 on page 174 of the above publication employs a coaxial resonator closed at both ends and coupled to the waveguide via a slot. Tuning is accomplished by varying the length of the cavity. Such prior art cavity resonator structures are relatively difficult to fabricate.

*Summary of the present invention*

The principal object of the present invention is the provision of an improved radio frequency solid-state apparatus having a negative resistance at radio frequencies.

One feature of the present invention is the provision of an improved radio frequency solid-state negative-resistance apparatus of relatively simple construction having a conductive post structure extending across the waveguide with the post containing a cavity resonator having the solid state device mounted therein and such resonator being coupled to the waveguide via a capacitive gap circumscribing the post and internal cavity resonator.

Another feature of the present invention is the same as the preceding feature wherein the resonator is tuned by varying the capacitance of the gap.

Another feature of the present invention is the same as any one or more of the preceding features wherein the resonator is tuned by a tuning member projecting into the resonator structure.

Another feature of the present invention is the same as any one or more of the preceding features wherein the resonator is axially movable within the post structure for changing the capacitance of the gap.

Other features and advantages of the present invention will become apparent upon a perusal of the following specification taken in connection with the accompanying drawings.

*The description of the drawings*

*Description of the preferred embodiments*

Figures 1, 2, 3:
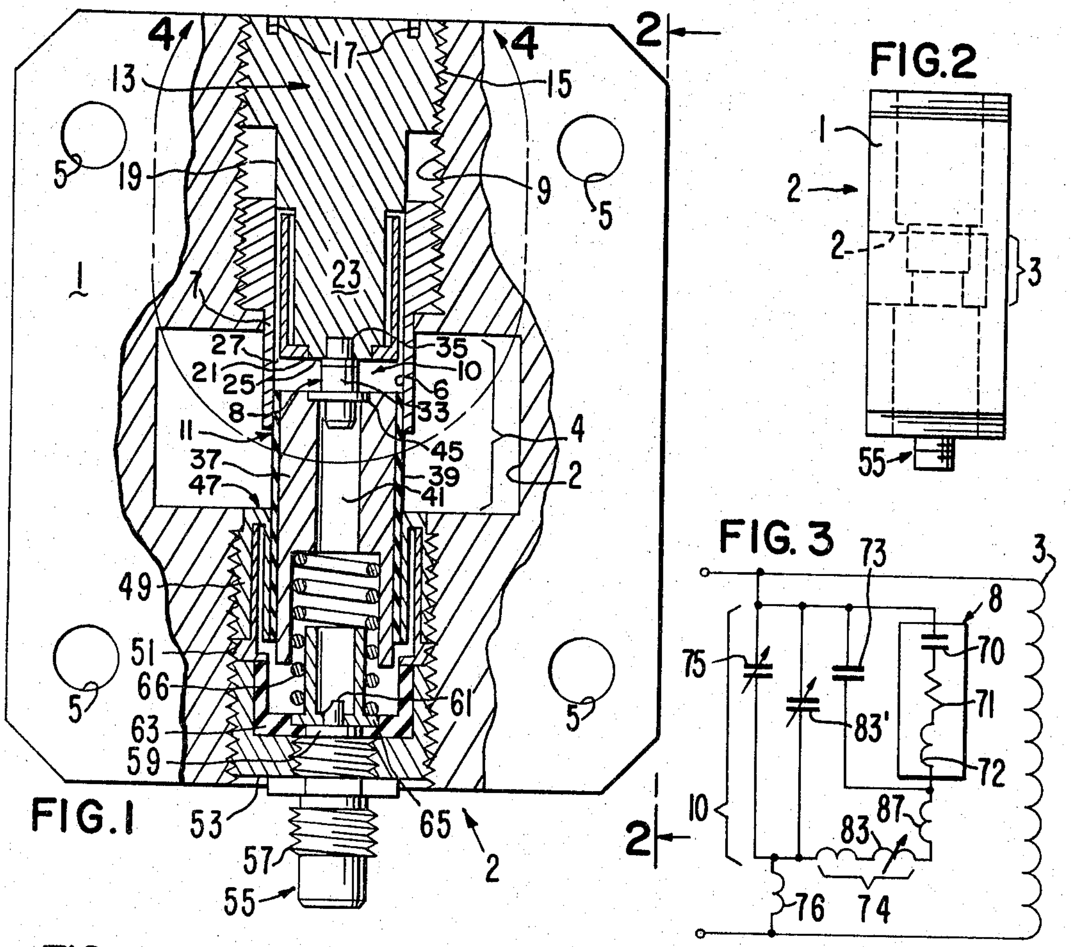
FIG. 1 is a view, partly in section, of a microwave oscillator according to the present invention.
FIG. 2 is a side view taken in the direction of the arrows 2—2 in FIG. 1.
FIG. 3 is an equivalent circuit diagram for the structure of FIG. 1.

Referring now to FIGS. 1 and 2, there is shown an X-band oscillator incorporating features of the present invention. Briefly, the oscillator includes a block body structure 1 as of aluminum containing a section of rectangular waveguide 2 which is closed at one end by a conductive wall 3 defining a shorting plane. A conductive post structure 4 extends across the waveguide 2 and contains therewithin a conductive chamber 6 defining, with an active avalance diode 8, a coaxial cavity resonator structure 10 tuned to an X-band operating frequency of the oscillator. The post structure 4 is transversely segmented to define a capacitive gap 11 for coupling radio frequency energy from the resonator 10 into the waveguide 2 and thence to a utilization device, not shown, via an output port at the open end of the waveguide structure. Mounting holes 5 are provided in the block 1 and are threaded to receive screws and are properly spaced to mate with standard waveguide components.

Post structure 4 includes a threaded sleeve 7 of aluminum, for example, which extends into the waveguide through a threaded opening 9. A plug 13 of copper, for example, has a threaded portion 15 provided with recesses 17 into which a tool (not shown) having corresponding projections can be inserted to turn plug 13. A cylindrical portion 19 of plug 13 is dimensioned to provide a sliding fit within sleeve 7. A cup 21 surrounds an end portion 23 of plug 13 and is joined thereto by soldering, for example. Cup 21 together with end portion 23 and sleeve 7 forms a folded choke for electrically shorting the lower face 25 of end portion 23 to sleeve 7 at the microwave frequencies encountered in use.

Cup 21 is dimensioned to surround end portion 23 for a distance of approximately ¼ wavelength at the operating frequency so that the total electrical distance from the electrical connection between cup 21 and lower face 25 to a point 27 between cup 21 and sleeve 7 is ½ wavelength. Hence point 27 is a short circuit at microwave frequencies.

A semiconductor diode 8 having a negative resistance in the desired operating frequency range includes a cylindrical insulator body 33 of alumina ceramic, for example, within which the active semiconductor element is mounted to a stud 35 of copper, for example. Stud 35 which is one of the electrical terminals of diode 8 may be soldered within a corresponding recess in end portion 23 to provide good electrical and thermal conductivity.

A tuning plunger 37 which may be copper, for example extends into sleeve 7 and is insulated therefrom by a tubular insulator 39 which may comprise plastic insulating tape, for example. Plunger 37 has a longitudinal bore 41 within which the second electrical terminal 45 of diode 8 fits.

A second ½ wavelength folded choke 47 is formed by choke housing 49 and choke insert 51. Choke 47 functions as described above to cause plunger 37 to be electrically shorted to the waveguide at the point where plunger 37 passes through the waveguide wall.

A retainer 53, of aluminum for example, receives a coaxial connector 55 within a central threaded opening. Connector 55 comprises an outer conductor shell 57, an insulating sleeve 59 and a center conductor 61. Center conductor 61 passes through an insulating cup 63 and is electrically connected to a spring retaining cup 65, of brass for example. Spring 66 which may be of music wire silver plated for improved electrical conductivity, is compressed between spring retaining cup 63 and plunger 37 to maintain plunger 37 firmly pressed against diode 8 which acts as a spacer maintaining a selected distance between plunger 37 and the lower face 25 of plug 13.

In operation, a reverse bias potential is applied between center conductor 61 and outer conductor shell 57. In the embodiment as shown using an avalanche diode as the active semiconductor, the P+ or avalanche end of the semiconductor is mounted to stud 35 in order to provide good thermal conductivity to dissipate heat generated in the avalanche zone. The bias voltage is applied so that the center conductor 61 is more positive than the outer conductor shell 57. Current then flows from the center conductor to the spring retaining cup 65, the spring 66, tuning plunger 37, diode 8, plug 13, body 1, retainer 53 and returns to outer conductor shell 57 of connector 55.

Starting with a small bias voltage and gradually increasing the voltage, the diode at first conducts little current, corresponding to a high positive resistance. When the bias voltage is increased to a value known as the avalanche voltage, the diode suddenly begins to conduct much larger currents, corresponding to the onset of the avalanche phenomenon, producing oscillation within the cavity and operation in the negative resistance region of the diode characteristic. When the avalanche phenomenon occurs, the current to the diode must be limited by the power supply to avoid overheating of the semiconductor. Moreover, the oscillation frequency depends to a certain extent upon bias current making current control necessary.

Since the negative resistance of the diode covers a broad spectrum of frequencies, the operating frequency of the coaxial resonator is varied by turning plug 13 within the correspondingly threaded bore in body 1. The resulting translational motion of plug 13, diode 8 and tuning plunger 37 within sleeve 7 varies the length of the capacitive gap between tuning plunger 37 and sleeve 7, varying the resonant frequency of the cavity.

As noted above, coupling to the waveguide occurs as a result of fringing out of the capacitive gap. Hence, tuning of the resonant frequency by varying the length of the capacitive gap also varies the coupling coefficient between the waveguide and cavity resonator. In particular, coupling decreases as the tuning plunger 37 moves deeper into sleeve 7.

An oscillator of the type described constructed for use in the X-band was capable of tuning over a range of 1 gHz. from about 8.1 to 9.1 gHz. without serious loss of coupling.

The choke mounting of the plug 13 prevents loss of energy from the cavity which would result if a metal-to-metal sliding contact were used. Consequently, the unloaded cavity Q is increased.

Similarly choke mounting of the tuning plunger 37 prevents microwave energy loss through the lower wall of the cavity.

The relatively weak coupling between the coaxial resonator 10 and the waveguide 2 produces very little loading of the coaxial resonator. As a result the initiation of oscillation is easier than in designs employing high coupling coefficients.

The large shunt admittance across the guide provided by the post structure 4 establishes an effective waveguide short at the position of the post 4. Hence, as long as the distance between back wall 3 and the post is made less than ¼ wavelength at the frequencies of normal operation, the closed portion of waveguide does not form a cavity that would influence the frequency of operation and the frequency of operation is controlled by the single tuning plunger adjustment. In practice, back wall 3 is located as close to the coaxial resonator as possible without influencing the pattern of the fringing field in the capacitive gap 11.

Referring now to FIG. 3 the equivalent circuit of a microwave oscillator according to the present invention includes, in the block numbered 8, the diode junction capacitance 70 in series with the semiconductor negative resistance 71 and the inductance 72 of the leads to the semiconductor. In parallel with this series combination is the parasitic capacitance 73 of the diode case.

Inductor 74 is formed by the inductance of the coaxial resonator 10. Capacitance 75 is formed by the capacitive gap 11 and the inductance 76 is formed by the self inductance of the post structure 4. Parallel inductor 3 is formed by the waveguide walls and end wall 3.

The inductance 74 of the coaxial resonator 10, the diode junction capacitance 70 and the gap capacity 75 predominately determine the center frequency of the tuning range at the desired point. Adjustment of the position of tuning plunger 37 varies the capacitance 75 and, hence, the operating frequency. In practice, inductance 74 is relatively small and capacitance 75 is quite large, hence the diode operates into a relatively low impedance resonant structure over a wide range of frequencies.

Figure 4:
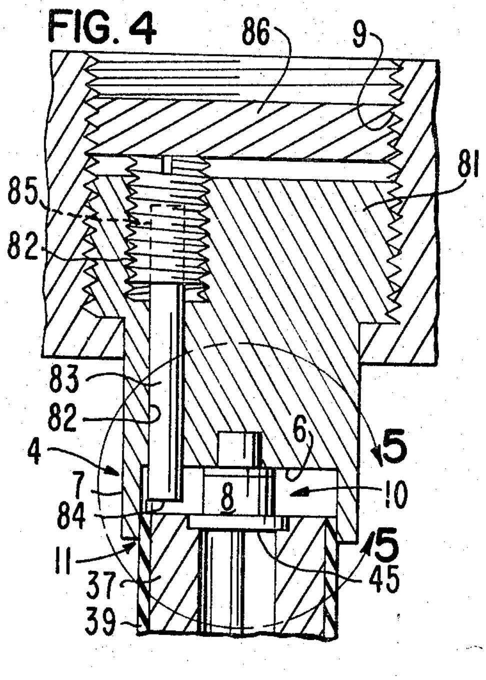
FIG. 4 is an enlarged view of an alternative structure for a portion of the structure of FIG. 1 delineated by line 4—4.

Referring now to FIG. 4 there is shown an alternative embodiment of the present invention. The structure is essentially the same as that of FIGS. 1 and 2 except that the size of the capacitive gap 11 is not changed in use for tuning of the resonator 10. As a result, the post structure 4 and the associated tuning means are greatly simplified, thereby reducing manufacturing expense with some sacrifice in adjustable overall tuning range. More specifically, the upper end of the transversely segmented post 4 is formed by a conductive plug 81 which is threaded into threaded bore 9.

The threads in the bore 9 are much coarser, as of 42 per inch, than in the former embodiment of FIGS. 1 and 2, as of 72 per inch, since the threads on the plug 81 are not involved in the movable tuning structure. The lower end of the plug 81 is counterbored to define the sleeve portion 7 and the upper portion of the conductive chamber 6. The aforedescribed choke structure 27 of FIG. 1 is thereby eliminated.

An eccentrically disposed axial bore 82 is provided in the plug 81 to receive a tuning screw structure 83. The upper end of the bore 82 is threaded with relatively fine threads, as of 72 per inch, to receive a threaded portion of the tuning screw structure 83. In one embodiment, the tuning screw structure 83 is conductive, as of silver plated brass, to provide an inductive tuner by displacing magnetic fields of the resonator 10 as the lower end 84 of the tuning screw 83 penetrates into the resonator 10. In an alternative embodiment, the lower non-threaded portion of the tuning screw 83 is made of a machinable dielectric material having a relatively high dielectric constant and a low loss tangent as of Stycast ceramic, having a dielectric constant of 15. In this case, the lower end 84 of the dielectric member, as it penetrates into the resonator 10, increases the capacity 83′ (see FIG. 3) of the resonator 10 for tuning thereof. The dielectric portion of the tuner 83 is preferably affixed to an outside threaded sleeve at its upper end as indicated by the dotted lines 85.

The tuning screw 83 permits fine tuning of the resonant frequency of the resonator 10. For example, an inductive tuning structure 83 permits about a ±75 mHz. change in the resonance frequency of the resonator when centered at about 11,502 mHz. with a penetration from 0.238" to 0.237" in a cavity having a height of 0.580". In case of the dielectric tuner, a ±108 mHz. change in the resonance frequency centered at 11,325 mHz. is obtained with a penetration of the dielectric end 84 from 0.274" to 0.342" in a cavity having a height of 0.580". A threaded plug 86 closes off the outer end of the bore 9 to prevent tampering with the tuning adjustment.

Figure 5:
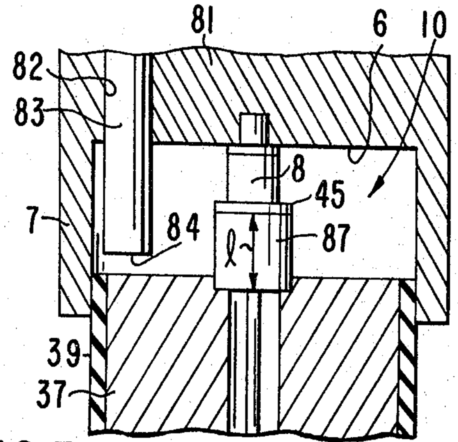
FIG. 5 is an enlarged view of an alternative structure to that portion of the structure of FIG. 4 delineated by line 5—5.

Referring now to FIG. 5 there is shown an alternative embodiment of the fine tuned resonator 10 wherein the cavity 6 is initially set to a center frequency near to the desired output frequency by means of a conductive stud 87, as of copper, forming an inductive member of the resonator 10 (see FIG. 3). By properly selecting the length, $l$, of the stud 87, the cavity resonator 10 is coarse tuned to a certain frequency such that the fine tuning screw 83 may be employed for tuning the resonator 10 to precisely the desired operating frequency. The lower end of the stud 87 is gripped by the inwardly tensioned fingers 37 and the upper end of the stud 87 is soldered to the lower flange 45 of the diode 8. In the aforementioned cavity resonator 10, the center resonant frequency is shifted from 11 gHz. to 9 gHz. by providing a stud 87 which has a length $l$ of 0.125". The stud 87 may be affixed to either end of the diode 8 to obtain its tuning effect. Typical output powers at X-band are between 40 and 60 milliwatts.

Although the invention has been described in some particularly with reference to one embodiment, it is understood that many changes could be made without departing from the scope of the invention. In particular, the invention could be practiced with any type of active semiconductor elements having a negative resistance at microwave frequencies, including LSA (Limited Space Charge Accumulation) and Gunn effect devices. Hence it is intended that all matter contained in the above description or shown in the accompanying drawings shall be interpreted as illustrative and not in a limiting sense.

What is claimed is:

1. In a solid-state negative-resistance radio frequency apparatus, means forming a hollow wave supportive structure, means defining a conductive post structure disposed within and extending across the hollow interior of said wave supportive structure, said post structure defining a capacitive gap entirely circumscribing said post structure and in a radio frequency wave communication with said wave supportive structure, said capacitive gap being in series with the self inductance of said post structure, means forming a solid-state device capable of exhibiting negative-resistance to a coupled circuit under certain conditions of bias potential applied to said device, means for applying the certain bias potential to said device for causing said device to exhibit negative resistance, the improvement comprising, means defining with said device a substantially closed resonator structure at least partially defined by said post structure and having a radio frequency resonance substantially independent of said hollow wave supportive structure, said resonator being tuned for a resonance at a certain radio frequency defining the operating frequency of the apparatus, and said resonator being radio frequency coupled to said wave supportive structure via the intermediary of said capacitive gap.

2. The apparatus of claim 1 wherein said substantially closed resonator structure includes said device coaxially disposed therein, and said resonator being contained within said post structure.

3. The apparatus of claim 1 wherein said capacitive gap includes a portion circumscribing said resonator for radio frequency coupling said resonator to said waveguide, and said circumscribing capacitive coupling gap forming a capacitive element common to said resonator and to said post structure.

4. The apparatus of claim 3 including means for tuning and resonator for changing the operating radio frequency of the apparatus.

5. The apparatus of claim 4 wherein said tuning means includes means for changing the capacitance of said circumscribing capacitive coupling gap which is common to said resonator and said post structure.

6. The apparatus of claim 4 wherein said tuning means includes a tuning member movable within said resonator for changing the resonant frequency of said resonator.

7. The apparatus of claim 3 wherein said post structure includes a pair of axially spaced segments, said segments including axially coextensive adjoining end portions with one end portion nested in non-electrically contacting relation within the other end portion to define said circumscribing capacitive gap.

8. The apparatus of claim 7 including, means for producing relative axial movement between said pair of post segments for varying the capacity of said capacitive gap and thus the resonant frequency of said resonator having said capacitive gap as an element thereof.

9. The apparatus of claim 8 wherein one of said post segments is fixed in position and the other one of said post segments is a axially movable, said fixed post segment being hollow, means forming an axially movable conductive plug disposed within said hollow fixed post segment, said device being disposed in between said plug and an end of said movable post segment, means for spring biasing said movable post segment, said device, and said movable plug together for maintaining a fixed axial spacing between said plug and said movable post segment, means for producing axial movement of said plug to cause said movable post segment to track changes in the axial position of said plug for changing the capacitance of said capacitive gap and the resonant frequency of said resonator.

10. The apparatus of claim 2 wherein said wave supportive structure is a hollow waveguide, means forming a conductive wall structure forming a shorting plane across said waveguide, said wall being spaced from said post structure by less than one-quarter of a guide wavelength at the operating radio frequency of the apparatus.

References Cited

Gilden et al., "Electronic Tuning Effects in the Read Microwave Avalanche Diode," IEEE Transactions on Electron Devices, January 1966, p. 174.

Hines, "High-Frequency Negative Resistance Circuit Principles for Esaki Diode Applications," The Bell System Technical Journal, May 1960, p. 492.

ROY LAKE, *Primary Examiner.*

S. H. GRIMM, *Assistant Examiner.*

U.S. Cl. X.R.

307—322; 330—56; 331—107; 333—80, 83